United States Patent [19]
Newcomb

[11] Patent Number: 5,997,801
[45] Date of Patent: *Dec. 7, 1999

[54] METAL CHIP RECLAMATION SYSTEM

[75] Inventor: Kevin C. Newcomb, Toledo, Ohio

[73] Assignee: Hayes Lemmerz International, Inc., Rolumus, Mich.

[*] Notice: This patent is subject to a terminal disclaimer.

[21] Appl. No.: 09/002,831

[22] Filed: Jan. 5, 1998

Related U.S. Application Data

[63] Continuation of application No. 08/356,416, Dec. 15, 1994, Pat. No. 5,705,123.

[51] Int. Cl.⁶ .................................................. C22B 9/16
[52] U.S. Cl. ...................... 266/200; 266/144; 266/205; 266/905
[58] Field of Search ................................. 266/144, 200, 266/205, 907

[56] References Cited

U.S. PATENT DOCUMENTS 5,407,462  4/1995  Areaux ..................... 266/901
5,705,123  1/1998  Newcomb ................. 266/144

*Primary Examiner*—Melvyn Andrews
*Attorney, Agent, or Firm*—MacMillan, Sobanski & Todd, LLC

[57] ABSTRACT

An apparatus and method for reclaiming metal chips formed while machining metal castings to their finished shape. The apparatus includes a stationary charging tube extending in a generally perpendicular direction from the charge well of a reverbratory furnace. The lower end of the charging tube is attached to a box-shaped structure which has an open bottom. The sides of the structure extend into a pool of molten metal contained in the charge well. A variable rate feeder provides a continuous supply of metal chips to the charging tube at a rate which is essentially the same as the rate at which the chips are being produced. The chips form a column within the charging tube which extends through the box-shaped structure and into the pool of molten metal. As the chips at the bottom of the column are melted, additional chips are added to the top, forcing the bottom of the column of chips into the pool of molten metal.

12 Claims, 9 Drawing Sheets

(PROIR ART)

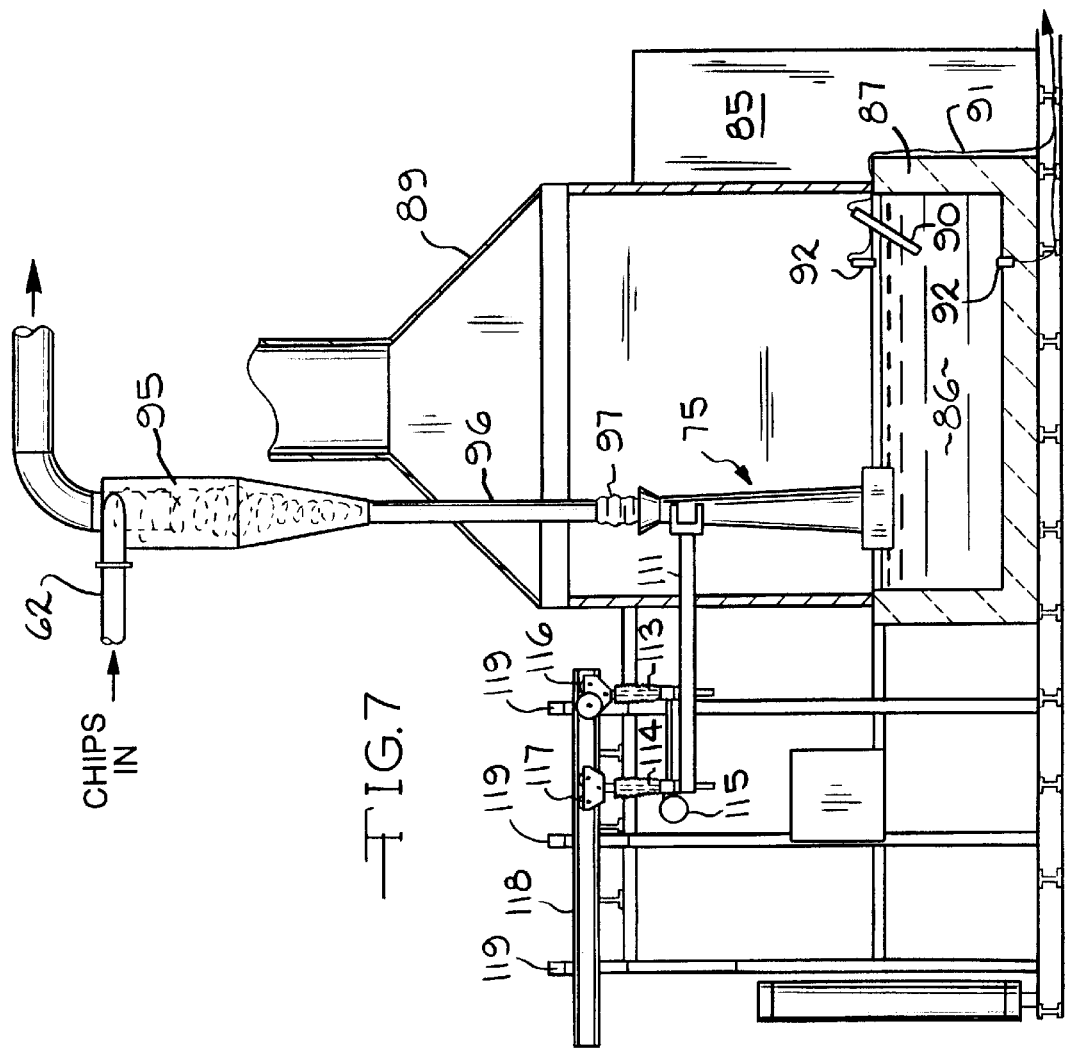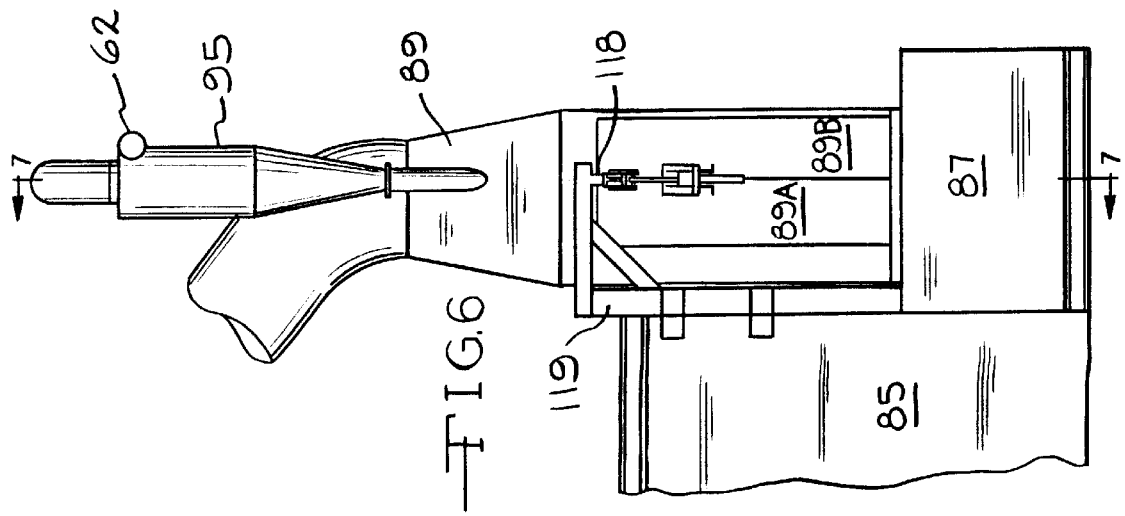

METAL CHIP RECLAMATION SYSTEM

CROSS REFERENCE TO RELATED APPLICATIONS

This application is a continuation of U.S. patent application Ser. No. 08/356,416, filed on Dec. 15, 1994, now U.S. Pat. No. 5,705,123.

BACKGROUND OF THE INVENTION

This invention relates in general to the manufacture of cast metal components and in particular to an apparatus and method for reclamation of metal chips which are produced when the components are machined to final shape.

Metal components, such as vehicle wheels cast from alloys of light weight metals, are typically produced in high volumes on highly automated production lines. Such production lines include a melt furnace for melting metal stock. A casting machine which typically includes a plurality of molds is located adjacent to the melt furnace. The molds are sequentially filled with molten metal from the melt furnace to form rough castings. After the rough castings have cooled sufficiently, they are removed from the molds, allowing the molds to be filled again.

The rough castings are machined to a final shape. The machining typically includes a plurality of discrete operations, such as drilling, boring, turning and facing. The machining operations are usually performed at multi-tool computer-controlled machining stations. To aid the machining operation, the cutting tool is usually sprayed with a cooling and lubricating fluid as the metal is being cut. The components also may be painted and/or given a clear coating between machining operations.

As the rough casting is machined to the final shape, small pieces, or "chips", of metal are cut from the casting surface. Depending upon the component being manufactured, a significant amount of chips can be produced. For example during the machining of a typical vehicle wheel, as much as eight pounds of chips can be produced. It is desirable to reclaim the metal chips by collecting and melting them for use in casting additional components.

A typical known reclamation system for collecting and remelting metal chips is shown generally at 10 in FIG. 1. FIG. 1 is a block diagram which shows the flow of metal chips through the system 10. Metal chips are produced by a plurality of machining operations, two of which, 11 and 12, are shown. As described above, the metal chips are typically contaminated with cutting and cooling fluid and may be coated with paint.

The chips are collected and moved to a central chip processing facility 13. The chip collection and movement can be continuous with conventional material handling equipment such as conveyor belts or pneumatic conveyors linking the individual machine machining operations 11 and 12 to the central chip processing facility 13. Alternately, the chips can be accumulated in individual bins located adjacent to each machining operation and periodically collected and transported to the chip processing facility 13.

The central chip processing facility 13 typically includes a centrifuge and rotary drum kiln. The centrifuge removes excess water and oil from the chips. The kiln dries the chips and burns contaminants off the chip surfaces. The dried chips are deposited in a chip storage hopper 14.

The dried metal chips are transferred from the storage hopper 14 to a remelt furnace 15, which is dedicated to melting the chips. The remelt furnace 15 is typically a conventional reverbratory furnace having a central chamber which is heated by combustion burners fueled with oil or natural gas. Metal stock is melted in the central chamber to form a pool of molten metal. An open charge well and circulation well extend from the central chamber and contain a portion of the molten metal. The charge well receives the metal chips for melting while the circulation well allows removal of molten metal from the furnace. Because of the large volume of chips being processed by the remelt furnace 15, it is common to include a circulation pump which continuously moves the molten metal between the central chamber and the charge and circulation wells.

If the dried chips are simply thrown or otherwise deposited upon the surface of the molten metal in the remelt furnace charge well, the chips will disturb the metal oxide skin, or dross, which normally exists on top of the molten metal. The disturbance of the metal oxide skin results in the agglomeration of many of the metal chips into the metal oxide skin. Accordingly, only a small portion of the metal chips actually sink into the molten metal and are melted.

The chips which are agglomerated are not submerged in the molten metal, but are raised in temperature by the molten metal. Because they are in the presence of oxygen, the agglomerated chips are oxidized and are absorbed into the dross. The dross is periodically removed from the furnace and discarded. Thus, the chips which are oxidized are lost. Additionally, while the chips are being oxidized, any surface contaminates remaining on the chips are burned off, releasing fumes into the workplace.

In order to assure that the chips are melted, the dried metal chips are loaded into the remelt furnace with a chip charger 16. The chips are batch loaded into the chip charger 16 which then inserts the chips below the surface of the molten metal in the remelt furnace 15.

Known chip chargers 16 are typically complex devices. One known chip charger, as disclosed in U.S. Pat. No. 4,702,768, includes an chip compactor and strip forming apparatus to extrude the chips into stripform metal. The stripform metal is then forced below the surface of the molten metal.

Another known chip charger, as disclosed in U.S. Pat. No. 4,872,907, includes a tube which has one end inserted below the surface of the molten metal. A helical auger compacts the metal chips and forces the compacted chips through the tube and into the charge well. Upon exiting the delivery tube, the compacted chips dissociate from one another and are immediately melted. A charge well cover, which is disclosed in U.S. Pat. No. 5,211,744, covers a substantial portion of the surface of the molten metal and is in contact, or close proximity, therewith to further prevent oxidation of the chips. A mechanism is included which raises and lowers the cover as the level of the molten metal varies to maintain the contact therebetween.

After the chips are melted, molten metal can be drawn from the remelt furnace 15 and placed into ladles (not shown). The ladles are transported, as shown by the dashed lines in FIG. 1, to charge a plurality of individual production line melt furnaces, two of which, labeled as 17 and 18, are shown in FIG. 1. The molten metal is poured from the ladles into the melt furnaces. Alternately, the reclaimed metal chips can be cast into ingots, or "sows". The sows are transported to the melt furnaces for melting. Molten metal, which includes the melted metal chips, is drawn from the melt furnaces 17 and 18 to supply casting machines 19 and 20.

The known reclamation system 10 illustrated in FIG. 1 has several shortcomings. The system 10 batch loads metal reclaimed from the chips into the melt furnaces. This decreases the ratio in the melt furnaces between primary melt of new stock and chips. Some applications, such as casting vehicle wheels, require that a high ratio be maintained. While the reclamation system 10 removes the majority of oil and paint, a small amount remains on the chips. The chip stream can also include dirt and particles of other metal, such as steel from the tools used in the machining operations. These materials contaminate the molten metal in the melt furnaces. Accordingly, a minimum value for the ratio of new stock to chips is specified to maintain the quality of the castings. The batch loading of the reclaimed metal chips also can excessively reduce the temperature of the molten metal, causing crystallization or solidification thereof.

Additionally, the transport of molten metal between the remelt furnace 16 and the individual production line melt furnaces 17 and 18 posses a safety concern. The transport also would require additional manpower. Furthermore, the use of a central furnace 32 solely dedicated to melting metal chips is inefficient, requiring additional energy to maintain the melted chips.

Accordingly, it would be desirable to continuously deliver chips directly to the individual melt furnaces 17 and 18 for melting. However, the cost of installing a prior art chip charger on each melt furnace would be very high.

SUMMARY OF THE INVENTION

The present invention relates to an improved apparatus and method for continuously reclaiming metal chips produced during the machining of metal components.

The apparatus includes a tube adapted to be supported over a pool of molten metal contained in a reverbratory furnace charge well. The tube extends in a generally perpendicular direction from the charge well and has a first end adjacent to the charge well and a second end opposite from the first end. The apparatus also includes a cover plate attached to the first tube end. The cover plate has an opening formed therethrough concentric with the first tube end. A wall is formed around the perimeter of the cover plate and extends into the pool of molten metal contained in the furnace charge well.

The tube can be tapered to form a conical frustum. The tube is mounted in a stationary position over the charge well. The tube second end is connected to a variable rate feeder which supplies the metal chips at a predetermined rate to the tube.

The method includes supplying chips in a continuous stream to the second end of the apparatus. The chips are supplied at a rate which is equivalent to the rate at which the chips are being produced. The chips form a column of metal inside the tube. The column floats upon the surface of the pool of molten metal. However, the cumulative weight of the chips in the column forces the lower end of the column beneath the surface of the pool of molten metal, where the chips are melted. As the chips in the bottom of the column are melted, the weight of the chips added to the top of the column force more of the column into the pool of molten metal.

The wall formed around the perimeter of the cover plate forms a seal between the pool of molten metal and the surrounding atmosphere. This seal reduces oxidation of the column of chips before insertion into the molten metal. The seal also reduces energy loss through radiation in the area under the cover plate which improves the melting capacity of the apparatus.

Other advantages of the invention will become apparent from the following detailed description of the invention and the accompanying drawings.

BRIEF DESCRIPTION OF THE DRAWINGS

FIG. 6 is a partial side elevational view of a melt furnace shown in FIG. 3.

FIG. 7 is a sectional view taken along line 7—7 in FIG. 6 which shows a chip charger in accordance with this invention.

DETAILED DESCRIPTION OF THE PREFERRED EMBODIMENT

Figure 1:
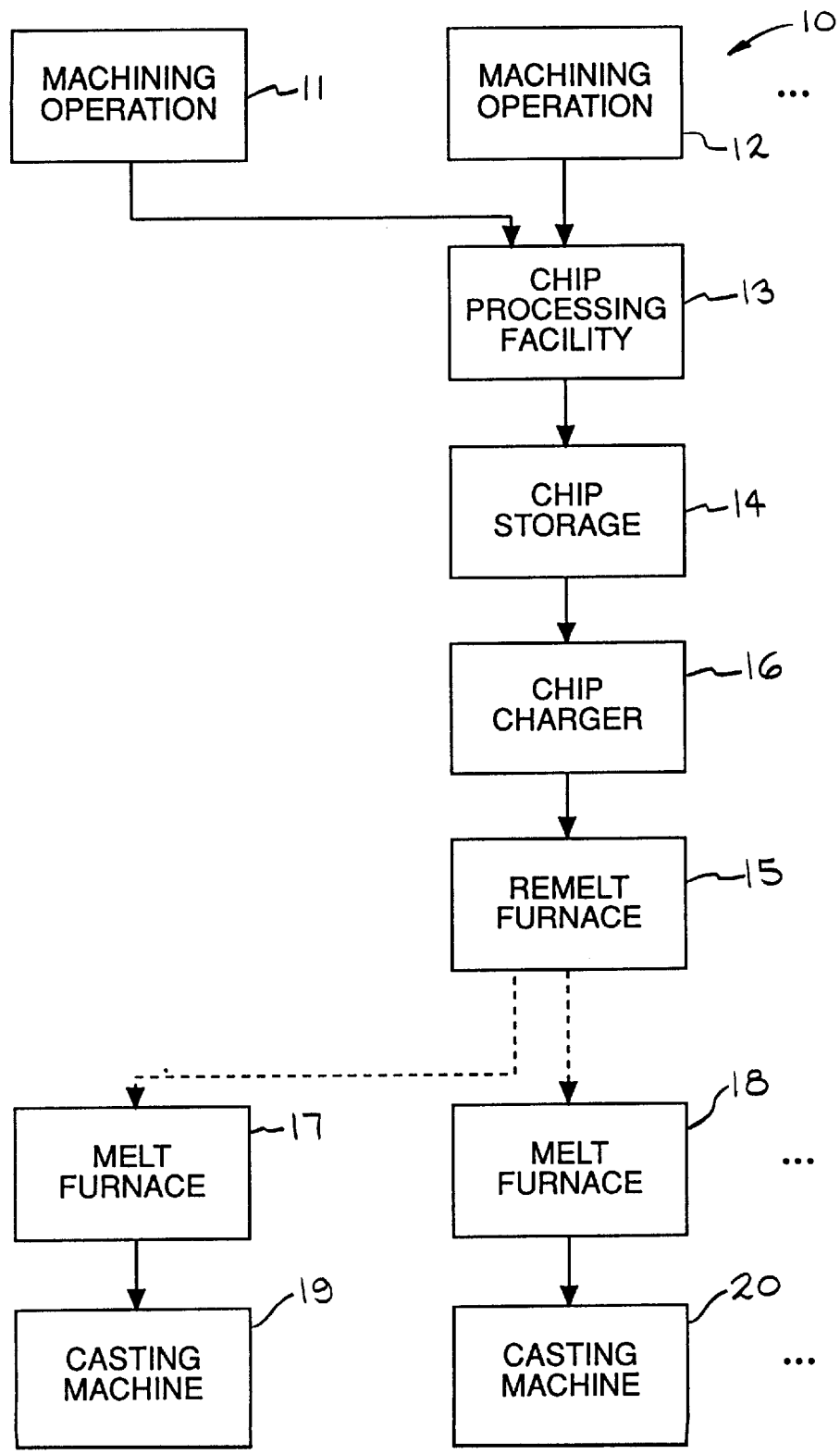
FIG. 1 is a flow chart for a known metal chip reclamation system.
Figure 2:
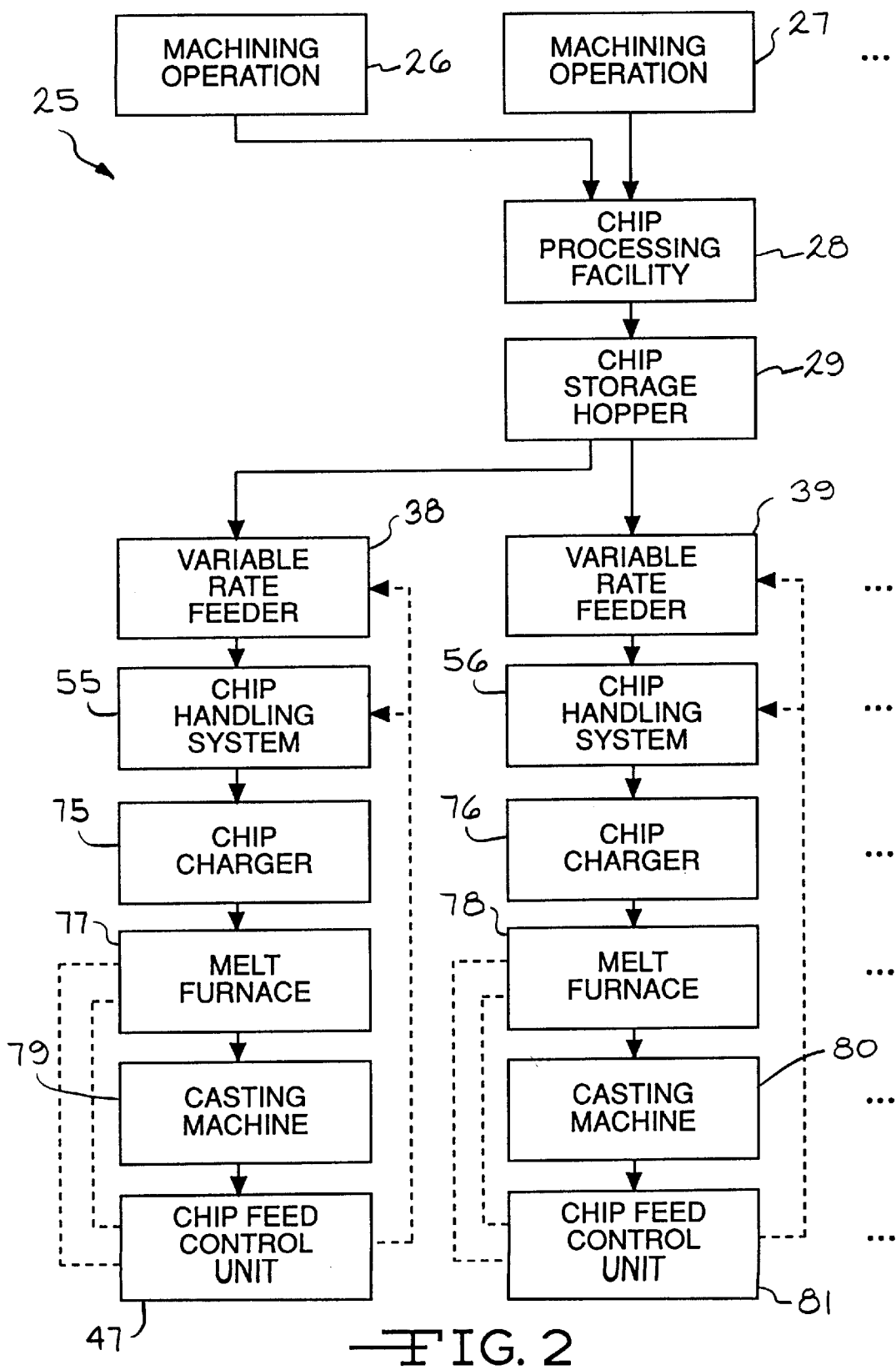
FIG. 2 is a flow chart of a metal chip reclamation system in accordance with this invention.

Referring now to FIG. 2, there is shown a flow chart of an improved chip reclamation system, which is shown generally at 25. The chip reclamation system 25 services a plurality of machining operations, two which are shown and labeled as 26 and 27 in FIG. 2. The reclamation system 25 includes a conventional conveyor system which is used to transport the chips from the machining operations to a central chip processing facility 28. The chip processing facility 28 is of conventional design and in the preferred embodiment includes a centrifuge and rotary chip drying kiln (not shown). Alternately, the processing facility 28 can include only a rotary kiln. A pneumatic conveyor system transfers the dried chips from the processing facility to a chip storage hopper 29.

Figure 3:
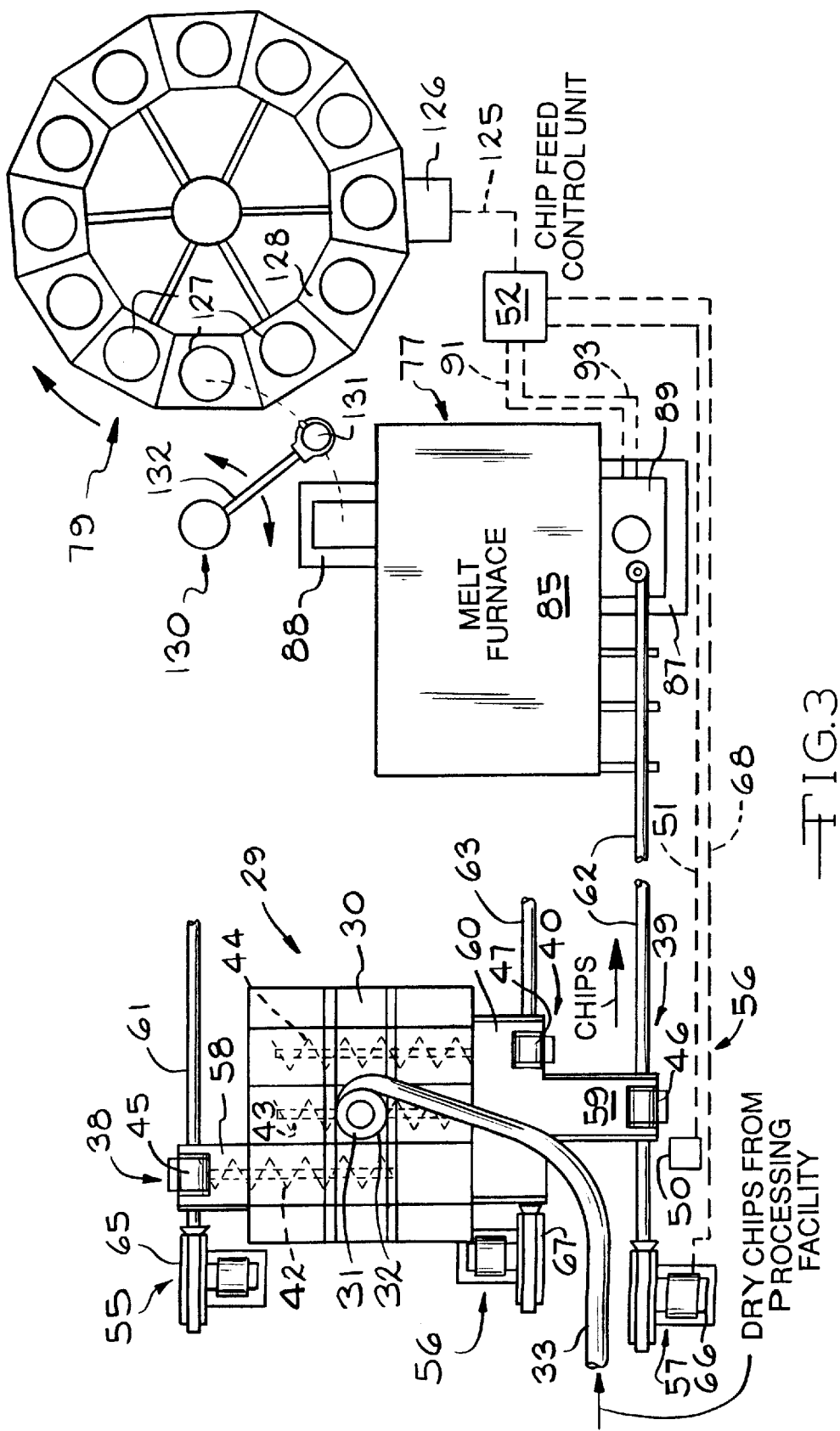
FIG. 3 is a plan view of the metal chip reclamation system shown in FIG. 2.
Figure 5:
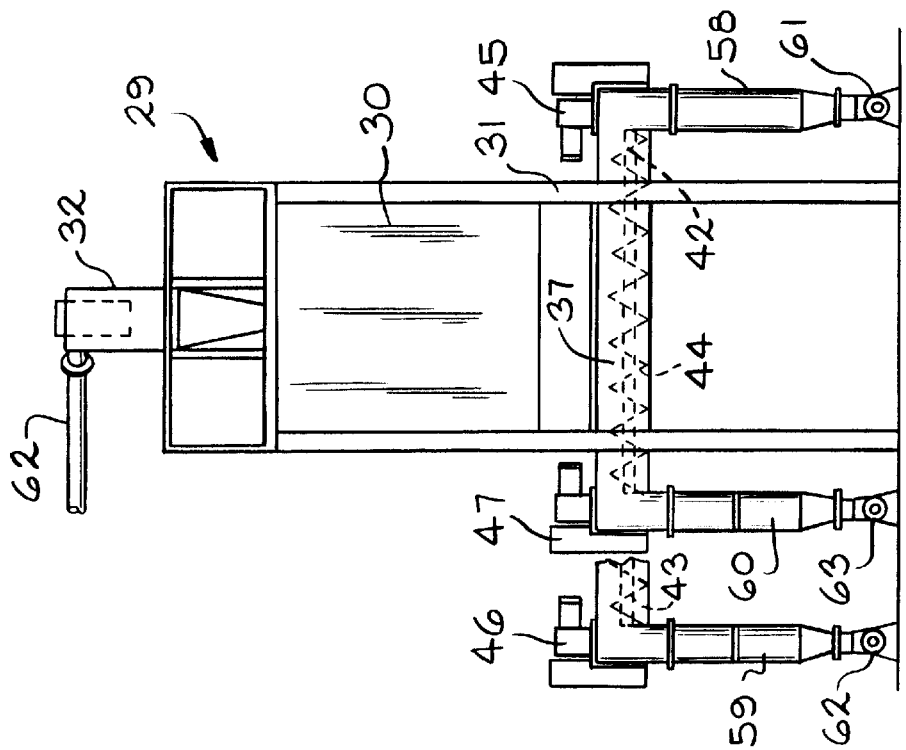
FIG. 5 is a side elevational view of the chip storage hopper shown in FIG. 3.
Figure 4:
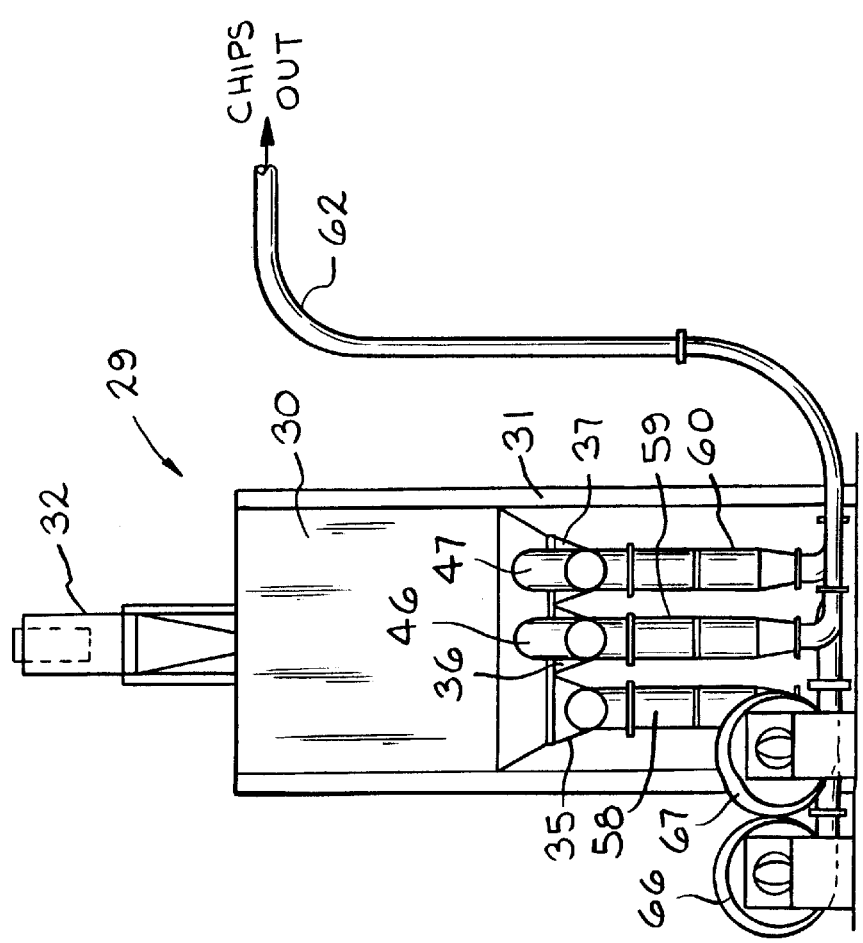
FIG. 4 is a front elevational view of a chip storage hopper shown in FIG. 3.

The chip storage hopper 29 is illustrated in FIGS. 3 through 5. The chip storage hopper includes a storage bin 30 supported above the floor of the production facility by a conventional supporting structure 31. A cyclone separator 32 is mounted on the top of the storage bin 30. The separator 32 receives dried chips from a pneumatically charged pipe 33 and removes the chips from the conveying air. The bottom of the storage bin 30 is formed into a plurality of hopper legs, 35, 36 and 37. While three hopper legs are shown in FIG. 4, it will be appreciated that more or less hopper legs can be included in the storage hopper 29.

A plurality of variable rate feeders, 38, 39 and 40 are included in the reclamation system 25 with one feeder mounted upon each of the hopper legs 35, 36 and 37, respectively. As best seen in FIGS, 3 and 4, the variable rate feeders 38, 39 and 40 include helical screw augers, 42, 43 and 44 which are disposed in each hopper leg. Each of the augers 42, 43 and 44 are driven by a variable speed motor, 45, 46 and 47, respectively. Each of the variable speed auger motors 45, 46 and 47 is electrically coupled to an auger speed controller. For clarity, only one auger speed controller 50, which is associated with the variable speed motor 46, is shown in FIG. 3. While the auger speed controller 50 is shown as a separate unit in FIG. 3, the controller 50 can be mounted directly on the motor 46 or located remotely therefrom. The auger speed controller 50 is electrically coupled, as shown by the dashed line 51 to a chip feed control unit 52. The function of the chip feed control unit 52 will be explained below.

A plurality of chip handling systems 55, 56 and 57 receive dry chips from the variable rate feeders 38, 39 and 40. Each of the chip handling systems 55, 56 and 57 includes a generally vertical chute 58, 59 and 60 located below the storage bin 30. Each of the augers 42, 43 and 44 has an end extending into the top of one of the vertical chutes 58, 59 and 60. The bottom of each of the chutes 58, 59 and 60 is connected to an opening in a corresponding dry chip transfer pipe 61, 62 and 63. Each of the transfer pipes 61, 62 and 63 has one end connected to an individual motor driven blower, 65, 66 and 67 respectively. As will be explained below, the other end of each of the transfer pipes 61, 62 and 63 is connected to a melt furnace associated with a casting production line. Each of the blowers 65, 66 and 67 have sufficient capacity to force the dry chips through the associated transfer pipe 61, 62 and 63. The drive motor of each of the blowers 65, 66 and 67 is electrically coupled to the chip feed control unit corresponding to the melt furnace at the end of the associated transfer pipe. For simplicity, only one of these couplings is shown in FIG. 3 where the drive motor for the blower 66 is electrically coupled by the line 68 to the chip feed control unit 52.

As shown in FIG. 2, Each chip handling system 55 and 56 shown in FIG. 2 is connected to a chip charger, 75 and 76 respectively. The chip chargers 75 and 76 are mounted upon melt furnaces, 77 and 78. Each of the melt furnaces 77 and 78 supply molten metal to an individual casting machine 79 and 80 which, in turn, produce castings for a dedicated production line. As shown by the dashed lines, each pair of associated melt furnace and casting machine are coupled to a chip feed control unit. Thus, melt furnace 77 and casting machine 79 are coupled to chip feed control unit 47 while melt furnace 78 and casting machine 80 are coupled to chip feed control unit 81. For simplicity, only melt furnace 77 and casting machine 79 will be described below, however, it will be appreciated that the other production line melt furnaces and casting machines are identical.

As shown in FIG. 3, the melt furnace 77 is a reverbratory furnace having a central chamber 85 which is heated by combustion burners fueled with oil or natural gas. Metal stock is melted in the central chamber 85 to form a pool of molten metal 86. An open charge well 87 and circulation well 88 extend from the central chamber 86 and contain a portion of the molten metal 86. The molten metal 86 circulates continuously between the central chamber 85 and the charge and circulation wells 87 and 88. The charge well 87 receives additional metal stock and chips for melting while the circulation well 88 allows removal of molten metal 86 from the furnace 77. An exhaust hood 89 covers the top of the charge well 87 and removes any fumes and smoke generated as the added metal stock and chips are melted. As best seen in FIG. 6, One side of the exhaust hood includes a pair of doors 89A and 89B, the purpose of which will be explained below. A thermocouple 90 is mounted on the circulation well 87 and extends into the molten metal 86. The thermocouple senses the temperature of the molten metal 86 and is electrically coupled by the line 91 to the chip feed control unit 52. The charge well also includes a pair of electrodes 92 for sensing the level of the molten metal 86.

The electrodes 92 are electrically coupled by the line 93 to the chip feed control unit 52.

As best seen in FIG. 7, the dry chip transfer pipe 62 terminates at a cyclone separator 95 which is suspended above the exhaust hood 89. The bottom of the cyclone separator 95 is connected to a generally vertical feed tube 96. The feed tube extends through the exhaust hood 89. The lower end of the feed tube 96 carries a flexible boot 97. The flexible boot 97, which is formed from high temperature resistant material, extends into the top portion of the chip charger 75.

Figures 8, 9:
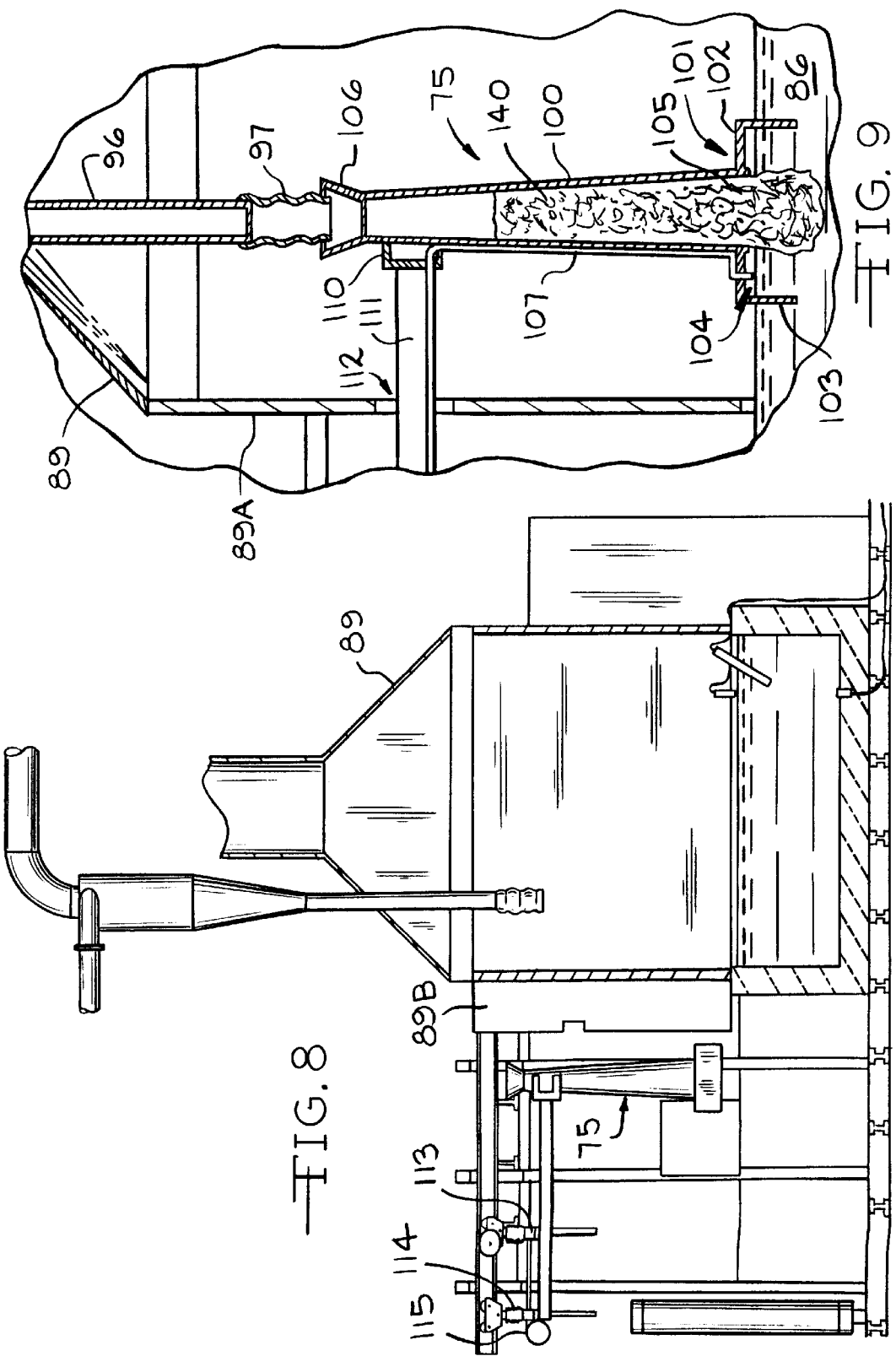
FIG. 8 is the sectional view shown in FIG. 7 with the chip charger in a withdrawn position.
FIG. 9 is a sectional view of the chip charger shown in FIG. 7.

As shown in the sectional view in FIG. 9, the chip charger 75 includes a generally vertical charging tube 100 which is formed from steel. The charging tube 100 has the shape of a hollow conical frustum. In the preferred embodiment, the charging tube 100 has taper of approximately two degrees, however, the invention can be practiced with a greater taper. While the charging tube 100 is shown having a conical shape, it will be appreciated that other shapes, such as a truncated pyramid or an untapered cylinder also can be used.

The bottom of the charging tube 100 is attached to a charger cover 101 formed from a heat and flame resistant material, such as carbide, graphite, a ceramic, mild steel, stainless steel, or mild or stainless steel covered with a refractory material. The cover 101 is a box-shaped structure which extends over a relatively small portion of the surface of the molten metal 86 contained in the charge well 87. The charger cover 101 includes a rectangular or square top portion 102 and a wall portion 103. The cover top portion 102 is above and generally parallel to the surface of the molten metal 86. The wall 103 extends downwardly in FIG. 9 from the perimeter of the top portion 102 into the molten metal 86 to define a hollow interior chamber 104. The wall 103 extends into the molten metal 86 to form a seal between the molten metal 86 and the atmosphere. The seal also causes any fumes released immediately below the chip charger 75 to be retained within the chamber 104. The wall 103 extends into the molten metal 86 to a sufficient depth to maintain the seal as the level of the molten metal mass 86 fluctuates with the removal and addition of metal. An opening 105 extends through the cover top portion 102. The opening 105 is concentric with the axis of the charging tube 100 and provides communication between the charging tube 100 and the cover chamber 104. In the preferred embodiment, the opening 105 is circular and has the same diameter as the inside diameter of the bottom of the charging tube 100. It will be appreciated that, while the charger cover 101 has been described as having a box-shaped structure, the cover structure can have other shapes. For example, the cover can be cylindrical with a circular top portion.

A steel funnel 106 is attached to the top of the charging tube 100. The funnel 106 receives the lower end of the flexible boot 97.

An optional conduit 107 formed from a high temperature resistant metal is shown mounted on the exterior of the charging tube 100 in FIG. 9. The conduit 107 extends axially along the charging tube 100 and passes through the cover 102 with one end extending into the chamber 104. The other end of the conduit 107 extends outside the exhaust hood 89 and is connected to a supply of an inert gas (not shown), such as nitrogen. For clarity, the conduit is only illustrated in FIG. 9.

The chip charger 75 is supported by a bracket 110 which is attached to the exterior of the charging tube 100. The bracket is secured to one end of a support beam 111. The support beam extends through an opening formed 112 through the exhaust hood doors 89A and 89B. The hood doors 89A and 89B are openable to allow removal of the chip charger 75. The support beam is suspended from a pair of jackscrews 113 and 114. The jackscrews are mechanically coupled to a reversible drive motor 115. Actuation of the drive motor 115 rotates the jackscrews to raise or lower the support beam 111 and the chip charger 75. One of the jackscrews 113 is suspended from a geared trolley 116 while the other jackscrew 114 is suspended from a plain trolley 117. The trolleys 116 and 117 are carried by a trolley rail 118 and moveable thereon towards or away from the charge well 87. The trolley rail 118 is sufficiently long to allow removal of the chip charger 75 from the exhaust hood 89. The trolley rail is attached to a plurality of brackets 119 which are secured to a side of the melt furnace main chamber 85.

The geared trolley 116 is operable by a chain fall or motor (not shown) to retract the support beam 111 and chip charger 75 from the charge well 87 and charge well exhaust hood 89. FIG. 8 illustrates the support beam 111 and chip charger 75 in the raised and retracted position. It will be appreciated that the flexible boot 97 is sufficiently flexible to allow withdrawal of the chip charger 75. Similarly, the boot 97 is sufficiently resilient to reposition itself within the funnel 106 when the chip charger 75 is reinserted into the hood 89.

As best seen in FIG. 3, the chip feed control unit 52 is electrically coupled by line 125 to a control unit 126 for the casting machine 79. An electrical demand signal is sent over line 125 to the control unit 52 when the casting machine 79 is operating. The casting machine 79 includes a plurality of molds 126 carried upon a rotatable carousel 128. The carousel 128 indexes the molds 127 into a position adjacent to the melt furnace circulation well 88. A means for transferring molten metal 130, such as a ladle 131 mounted on the end of a robotic arm 132, dips molten metal from the circulation well 88 and fills the adjacent mold 127. As the casting machine 79 indexes additional molds 127 into position for filling, the molten metal in the filled molds cools and solidifies to form a rough casting. The carousel 128 indexes the filled molds an unloading station (not shown) where the rough casting are removed, allowing refilling of the molds 127.

The operation of the chip reclamation system 25 will now be explained. Before operating the system 25, each of the variable rate feeders 38, 39 and 40 are calibrated to feed chips into the respective chip handling system 55, 56 and 57 at essentially the same rate that the chips are being produced by the associated production line. Thus, if a particular production line includes machining operations which are generating an average of eight pounds of chips per minute, the variable rate feeder corresponding to that line is calibrated to feed chips into the chip handling system at a rate of eight pounds per minute. The necessary setting can be entered directly into the variable drive controller 50. Alternately, the rate can be remotely entered at the chip feed control unit 52.

When the production line is operating, chips are collected from the machining operations 26 and 27 and transferred to the chip processing facility 28 where the chips are dried and decontaminated. The dried chips are transferred to the chip storage hopper 29. The hopper legs 35, 36 and 37 separate the dry chip supply into three chip streams.

When the casting machine 79 is in operation, the chip feed control unit 52 receives a demand signal over the line 125. In response to the demand signal, the chip feed control unit 52 sends a feeder control signal over line 51 to the variable rate feeder controller 50. The chip feed control unit 52 also sends a handling system control signal over the line 68 to the drive motor for the blower 66 associated with the melt furnace 85. In response to the feeder control signal, the variable rate feeder 38 begins a continuous transfer of dry chips from the corresponding hopper leg 36 into the chute 59. The dry chips fall through the chute 59 and enter the transfer pipe 62. In response to the feeder control signal, the blower 57 provides conveying air to the transfer pipe 62. The conveying air carries the dry chips through the transfer pipe to the cyclone separator 32.

The cyclone separator 32 separates the stream of dry chips from the conveying air. The chips fall from the bottom of the cyclone 32 into the feed tube 96. The chips fall through the feed tube and flexible boot 97 and enter the top of the chip charger 75. The chips are directed by the funnel 106 into the charging tube 100. The metal chips form a column in the lower portion of the charging tube 100, as shown in FIG. 9 where the column is labeled 140.

The chip column 140 has the shape of a conic frustum. The weight of the individual chips compresses the chips to form a compact mass. The chip column 140 extends through the charger cover opening 105 and into the furnace charge well 87. The chip column 140 floats on the mass of molten metal 86; however, the weight of the metal chips forces the lower end of the chip column 140 below the surface thereof. While the lower end of the column 140 melts, additional chips are added to the top, forcing more of the column into the molten metal 86. Thus only a small portion of the surface of the chip column 140 is exposed to the atmosphere.

The inventor has found that satisfactory results can be obtained upon filling only the lower portion of the charging tube 100 with metal chips. The downward extending cover wall 103 forms a seal between the lower end of the chip column 140 and the air surrounding the chip charger 75, further reducing the possibility of oxidation of the metal chips which are above the surface of the molten metal. Additionally, if the chip charger 75 is equipped with the optional conduit 107 described above, an inert gas, such as nitrogen can be introduced into the chip charger chamber 104 to prevent oxidation of the chips. Any fumes or smoke which are generated as the chips melt are vented through the charging tube 100 and funnel 106 into the exhaust hood 89.

If production is halted, the casting machine 79 is stopped. When the casting machine 79 stops, the casting machine control unit 126 sends a stop demand signal to the chip feed control unit 52. The chip feed control unit 52 is responsive to the stop demand signal to send stop signals to the variable rate feeder control unit 50 and the chip handling system 57 over the lines 51 and 68, respectively. Accordingly, the variable rate feeder control unit 50 stops the auger 43, halting transfer of dry chips to the chip handling system 55. The blower 57 continues to operate until the transfer pipe 62 is purged of chips, at which time the blower 57 is shut down, stopping the flow of chips to the chip charger 75. With the supply of chips halted, the portion of the chip column 140 that extends below the surface of the molten metal 86 is melted. The remainder of the chip column 140 floats on top of the molten metal 140 until delivery of chips is resumed. If the shut down is extended, the chip charger can be raised from the charge well 87 with the jackscrews 133 and 114 and retracted from the exhaust hood 89 with the trolleys 116 and 117.

The chip feed control unit 52 also provides two interlocks. If the thermocouple 90 detects that the temperature of the molten metal has fallen below a predetermined value, the chip feed control unit 52 stops the feed of chips into the charge well 87 until the temperature recovers. If the level of the molten metal 86 raises sufficiently to contact both electrodes 92, an electrical circuit is completed and a high level signal generated is generated. The chip feed control unit 52 is responsive to the high level signal to stop delivery of chips to the furnace charge well 87 until the level of the molten metal is lowered.

The above described reclamation system 25 provides a continual flow of chips to recharge each production line furnace. The chip flow rate is adjusted to match the production of metal chips by the machining operations associated with the production line. The continual chip flow maintains an essentially constant ratio between primary melt and chip melt. This uniform supply of chips spreads any impurities introduced with the chips throughout the molten metal 86. Additionally, the continual chip flow reduces the variations in molten metal temperature caused by the prior art batch feeding methods. The system also improves worker safety by eliminating the transport of molten metal from a central chip melting furnace to the production line melt furnaces. Additionally, the chip charger 74 is simpler than prior art chip chargers.

The distribution of the chips between a plurality of production line furnaces results in a relatively small amount of chips being melted in each furnace. Because the ratio of chip volume to furnace volume is reduced, the furnace circulation pump is not needed. Omission of the circulation pump reduces capital and maintenance costs. Additionally, energy consumption is reduced since the chips are melted in a nonagitated well. It also is easier to remove the dross since the dross is not disturbed by forced circulation of the molten metal.

It will be appreciated that while the invention has been described as having three production furnaces 35, 36 and 37, the invention can be practiced with any number of furnaces and machine tool stations.

Figure 10:
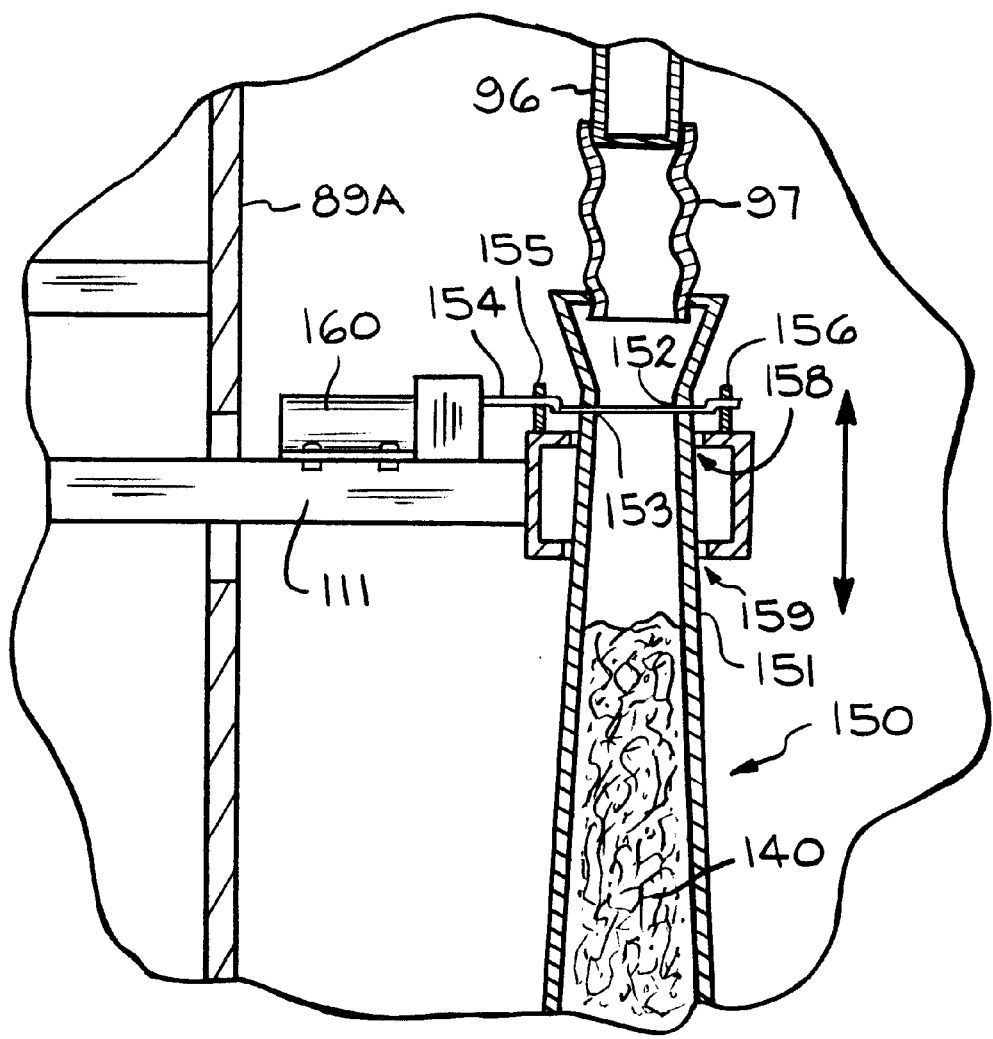
FIG. 10 is a partial sectional view of an alternate embodiment of the chip charger shown in FIG. 7.

A partial sectional view of an alternate embodiment 150 of the chip charger is shown in FIG. 10. Components shown in FIG. 10 which are identical to components described above have the same numerical designator. The chip charger 150 includes a charging tube 151 having a pair of apertures 152 and 153 formed through the upper end thereof. The charging tube 151 is suspended from a shaft 154 which passes through the apertures 152 and 153. The shaft 154 has an eccentric shape and is rotatably carried by a pair of supports 154 and 156. The supports 154 and 156 are attached to the top of box shaped structure 157. The structure 157 has a first hole 158 formed through the top and a second hole 159 formed through the bottom thereof. The charging tube 151 extends through the holes 157 and 158. There is sufficient clearance between the charging tube 151 and the holes 157 and 158 to allow vertical movement of the charging tube 151. One end of the shaft 154 is attached to the output shaft of a gear motor 160. The gear motor 160 is mounted upon the support beam 111.

When the gear motor 160 is energized, the eccentric shaft 154 rotates, imparting an vertical reciprocal motion to the chip charger 150. In the preferred embodiment, the shaft 154 rotates at approximately 30 revolutions per minute and the total stroke of the charging tube 151 is approximately one to two inches (2.54 to 5.08 cm.). As the charging tube 151 is raised, the chip column 140 remains stationary. However, the diameter of the charging tube 151 is effectively increased relative to the chip column 140. Accordingly, the weight of the chips spreads the column 140 into the wider diameter, increasing the column diameter. When the charging tube 151 descends, the narrower portion of the tube 151 forces the chip column 140 in a downward direction and deeper into the molten metal 86.

Figure 11:
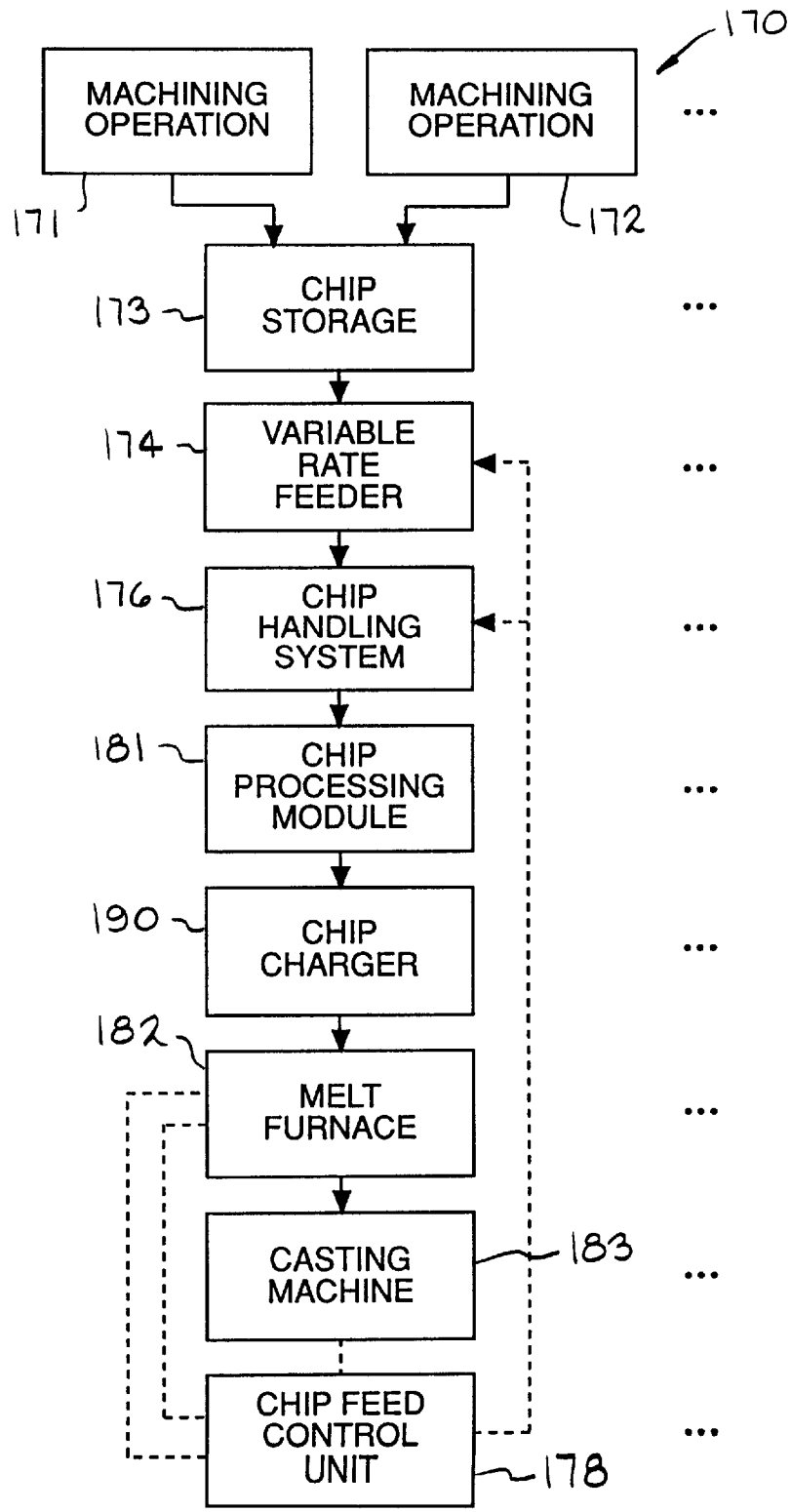
FIG. 11 is a flow chart of an alternate embodiment of the metal chip reclamation system shown in FIG. 2.
Figure 12:
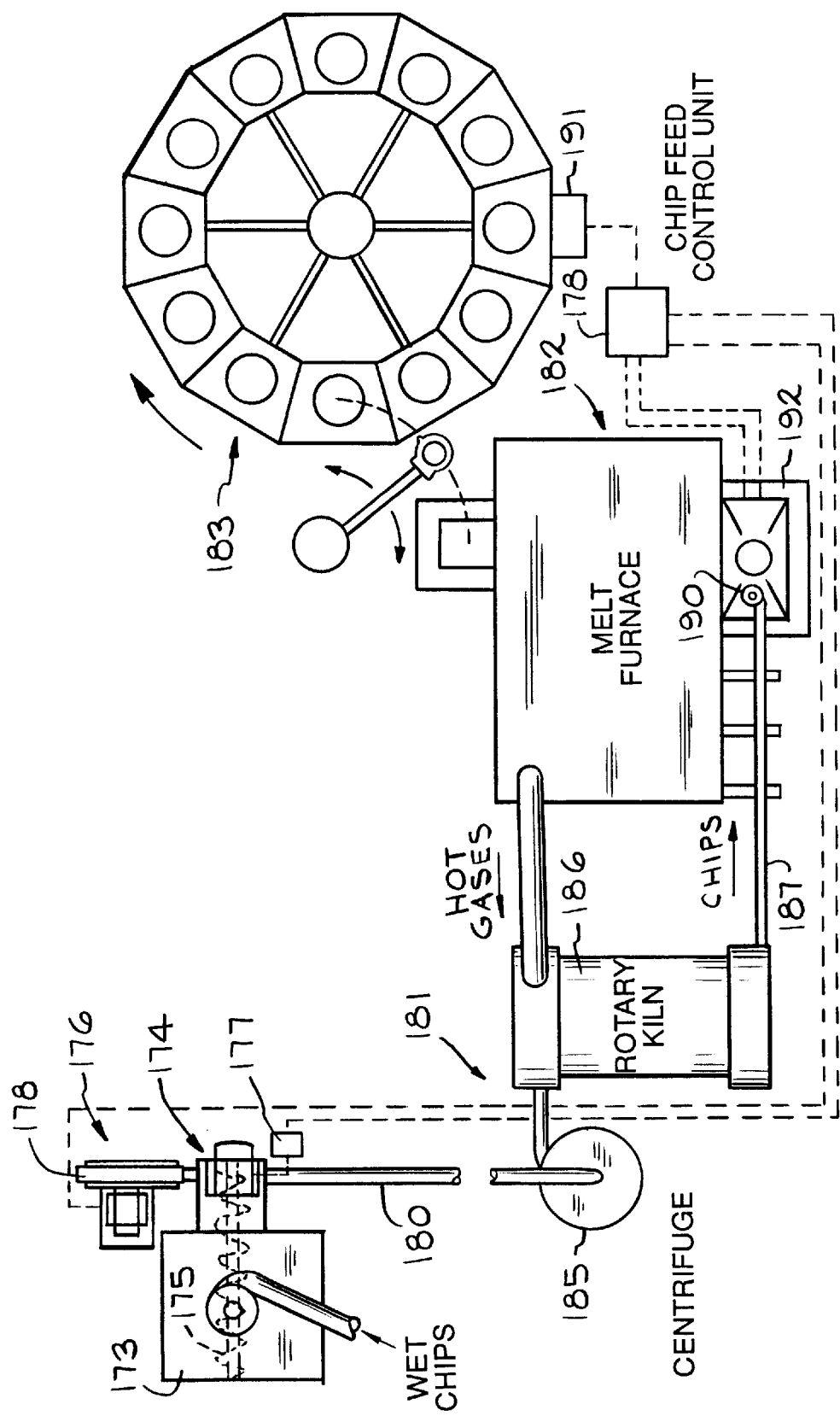
FIG. 12 is a plan view of the metal chip reclamation system shown in FIG. 11.

An alternate embodiment 170 of the chip reclamation system is illustrated by the flow chart shown in FIG. 11 and the plan view shown in FIG. 12. Components shown in FIG. 12 which are similar to components described above are labeled with the same numerical designator. The reclamation system 170 provides a complete dedicated chip reclamation cycle for the melt furnace which supplies molten metal to an individual production line. It will be appreciated that while one production line is shown in FIG. 6, the invention can be practiced on a plurality of production lines.

Metal chips are collected from all the machining operations for an individual production line. While two machining operations 171 and 172 are shown in FIG. 12, any number of operations can be included. In the preferred embodiment, wet chips are continuously transported by a conventional conveyor means to a chip storage hopper 173.

The storage hopper 173, which is shown in FIG. 12, is smaller than the chip storage hopper 29 shown in FIG. 3 since only one production line is serviced thereby. The bottom of the storage hopper 173 is formed as a single leg to allow gravity transfer of the metal chips to a variable rate chip feeder 174. Similar to the variable rate feeder 38 described above, the feeder 174 includes a variable speed auger 175 for feeding the metal chips into a chip handling system 176. The chip feeder is electrically coupled to an auger speed controller 177, as shown by the dashed line in FIG. 12. The auger speed controller 177 is electrically coupled to a chip feed control unit 178.

In the preferred embodiment, the chip handling system 176 includes a motor driven blower 179 which pneumatically forces the wet chips through a first transfer pipe 180. The blower motor is electrically coupled to the chip feed control unit 178. The first transfer pipe 180 terminates at a chip processing module 181 which is located adjacent to a melt furnace 182. As described above, the melt furnace 182 supplies molten metal to a casting machine 183.

The chip processing module 181 is specifically sized to process the volume of chips produced by the production line which is supplied by the melt furnace 182. Thus, the processing module 181 will generally be much smaller than the chip processing facility 28 shown in FIG. 2 which is designed to supply a plurality of production lines.

As shown in FIG. 12, the chip processing module 181 includes a small centrifuge 185, however this is an optional component and the invention can be practiced without the centrifuge 182. The discharge of the centrifuge 185 is connected to a small rotary kiln 185. In the preferred embodiment, the rotary kiln 185 is heated by exhaust gasses discharged from the melt furnace 182.

The discharge of the kiln 185 is connected by a second transfer pipe 185 to a chip charger 190 which is identical to the chip charger 75 described above.

As described above, the chip feed control unit 178 is also electrically coupled to a casting machine control unit 191. Similar to the chip reclamation system 25 described above, the chip feed control unit 178 is electrically coupled to a thermocouple (not shown) and a level detector (not shown) which are mounted upon the melt furnace charge well 192.

The operation of the chip reclamation system 170 will now be described. Before operating the system 170, the variable rate feeder 174 is calibrated to feed chips at essentially the same rate that they are being produced by the production line machining operations. The necessary setting can be entered directly into the variable drive controller 177. Alternately, the rate can be remotely entered at the chip feed control unit 178.

When the production line is operating, wet chips are collected from the machining operations 171 and 172 and transferred to the chip storage 173 where the chips are stored.

When the casting machine 183 is in operation, the chip feed control unit 178 receives a demand signal from the casting machine control unit 191. In response to the demand signal, the chip feed control unit 178 sends a feeder control signal to the variable rate feeder controller 177. The control unit 178 also sends a handling system control signal to the drive motor for the blower 178. In response to the feeder control signal, the variable rate feeder 174 begins transferring dry chips from the chip storage 173 into the chip handling system 176. In response to the feeder control signal, the blower 178 provides conveying air to the first transfer pipe 180. The conveying air carries the wet chips through the transfer pipe 180 to the chip processing module 181.

The wet chips are dewatered in the centrifuge 185 and dried and decontaminated in the rotary kiln 186. The dried chips are conveyed through the second transfer pipe 187 to the chip charger 190. As described above, the chip charger 190 inserts the chips below the surface of the molten metal contained in the furnace charge well 192. Similar to the reclamation system 25 described above, the chips are continuously fed from the chip storage 173 through the system 170 and into the melt furnace 182.

If production is halted, the casting machine 183 is stopped. When the casting machine 183 stops, the casting machine control unit 191 sends a stop demand signal to the chip feed control unit 178. The chip feed control unit 178 is responsive to the stop demand signal to send stop signals to the variable rate feeder control unit 177 and the chip handling system 176. Accordingly, the variable rate feeder control unit 177 stops the auger 175, halting transfer of wet chips to the chip handling system 176. Simultaneous with stopping the auger 175, the blower 178 is shut down, stopping the flow of chips to the chip charger 190.

Similar to the chip reclamation system 25, described above, the chip feed control unit 191 also provides two interlocks. If the thermocouple mounted on the charge well 192 detects that the temperature of the molten metal has fallen below a predetermined value, the chip feed control unit 178 stops the feed of chips into the charge well 192 until the temperature recovers. If the level of the molten metal raises above a predetermined level, a high level signal generated is generated. The chip feed control unit 178 is responsive to the high level signal to stop delivery of chips to the furnace charge well 192 until the level of the molten metal is lowered.

The chip reclamation system 170 allows sizing of all components to match the demand of an individual production line. This can result in significant cost savings with respect to chip processing, where the drying and decontamination of the metal chips is energy intensive. The central chip processing facility 28 for the first chip reclamation system 25 described above is designed to handle simultaneous operation of all the production lines. If all the production lines are not in operation, the full capacity of the central chip processing facility 28 is not needed and operation thereof is less efficient. On the other hand, the chip processing modules 181 for the second chip reclamation system are only operated when the associated production lines are in operation. This can be more efficient. Furthermore, the system 170 can be built in modules, with additional reclamation systems 170 being added when new production lines are built. Thus, the reclamation equipment at a production facility can be matched to present needs of the facility.

In accordance with the provisions of the patent statutes, the principle and mode of operation of this invention have been explained and illustrated in its preferred embodiment. However, it must be understood that this invention may be practiced otherwise than as specifically explained and illustrated without departing form its spirit or scope. For example, it will be appreciated that the plurality of individual chip feed control units shown in FIG. 2 can be replaced by one unit which controls all the variable rate feeders and chip handling systems at the production facility. Furthermore, a microprocessor based controller can be included in the chip feed control unit 47 to provide control of the chip reclamation system 25. Such a microprocessor controller can be responsive to vary the chip feed rate to match varying production rates of castings.

What is claimed is:

1. An apparatus for charging chips of metal into a revebratory furnace charge well adapted to contain molten metal, the apparatus comprising:

a generally vertical hollow charging tube adapted to be supported over the furnace charge well, said charging tube having first and second ends with said first end being adjacent to the surface of the molten metal contained in the furnace charge well, said second end of said charging tube being adapted to receive metal chips to be loaded into said charging tube and collected therein to form a column of metal chips having a sufficient height whereby the resulting weight of said column of chips formed in said charging tube will be sufficient to force an end of said column of chips from said first end of said charging tube and into said mass of molten metal contained in the furnace charge well; and a generally horizontal plate mounted upon said first end of said charging tube, said plate having an aperture formed therethrough, said aperture being aligned with said first end of said charging tube.

2. An apparatus as described in claim 1 wherein said charging tube is tapered with the width of said first end of said charging tube being greater than the width of said second end of said charging tube.

3. An apparatus as described in claim 2 further including a wall formed around the perimeter of said plate, said wall adapted to extend into the molten metal contained in the charge well to form a seal between said wall and the molten metal, said wall extending sufficiently into the molten metal to maintain said seal during fluctuations of the level of the molten metal within the charge well.

4. An apparatus as described in claim 3 further including a metal chip transporting mechanism which is adapted to feed metal chips into said second end of said charging tube.

5. An apparatus as described in claim 4 wherein said plate and said wall are formed from a heat-resistant material.

6. An apparatus as described in claim 2 wherein said charging tube is shaped as a frustum of an inverted cone.

7. An apparatus as described in claim 2 wherein said charging tube is shaped as a truncated pyramid.

8. An apparatus as described in claim 1 wherein said charging tube is shaped as a cylinder.

9. An apparatus for charging chips of metal into a revebratory furnace charge well adapted to contain molten metal, the apparatus comprising:

a generally vertical hollow charging tube adapted to be supported over the furnace charge well, said charging tube having first and second ends with said first end being adjacent to the surface of the molten metal contained in the furnace charge well, said second end of said charging tube being adapted to receive metal chips to be loaded into said charging tube and collected therein to form a column of metal chips having a sufficient height whereby the resulting weight of said column of chips formed in said charging tube will be sufficient that gravitational forces are sufficient to urge an end of said column of chips from said first end of said charging tube and into said mass of molten metal contained in the furnace charge well; and a generally horizontal plate mounted upon said first end of said charging tube, said plate having an aperture formed therethrough, said aperture being aligned with said first end of said charging tube.

10. A mass flow gravity feed furnace charger for use in conjunction with the charge well of a metal-melting furnace comprising:

a heat-resistant plate adapted to lie over the upper surface of molten metal in the charge well of a metal-melting furnace, said plate having an aperture formed therethrough;

a device for forming a substantially vertically-oriented column of metal chips within and above said aperture; and a mechanism for feeding additional metal chips to said column to increase the height and weight thereof whereby the height and weight of said column can be increased until the weight of said column gravitationally forces said column into the molten mass in the charge well.

11. A mass flow gravity feed furnace charger as described in claim 10 wherein said device for forming a column of metal chips includes an elongated metal chip feed conduit having a hollow interior, said conduit being substantially vertically-oriented over said molten metal in the charge well.

12. A mass flow gravity feed furnace charger as described in claim 11 wherein said feed conduit has a first end which is adjacent to said molten metal and a second end opposite from said first end and further wherein said mechanism for feeding metal chips is associated with said second end of said feed conduit and is adapted to feed metal chips thereinto.

* * * * *